United States Patent Office 3,084,170
Patented Apr. 2, 1963

3,084,170
CERTAIN 5-NITRO-2-FURYLAMIDOXIME DERIVATIVES
Anne Mary Von Esch, North Chicago, Ill., and William Reese Sherman, University City, Mo., assignors to Abbott Laboratories, North Chicago, Ill., a corporation of Illinois
No Drawing. Filed Oct. 19, 1961, Ser. No. 146,363
5 Claims. (Cl. 260—347.4)

This invention pertains to certain, new, substituted derivatives of 5-nitro-2-furylamidoxime having the formula

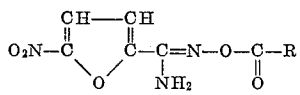

and a method for their prepartion. In this and succeeding formulae, R represent loweralkyl, loweralkoxy, chloroloweralkyl or phenyl. The terms "loweralkyl" and "loweralkoxy" as employed herein refer to the alkyl and alkoxy radicals containing from 1 to 4 carbon atoms, inclusive.

These new compounds are crystalline solids substantially insoluble in water but appreciably soluble in many organic solvents. They are active antibacterial and antifungal agents and can be employed as toxic constituents of disinfectant compositions for the control of such microorganisms as *Salmonella typhimurium, Escherichia coli, Chaetomium globosum, Fusarium oxysporum, Proteus mirabilis* and *Alternaria* species. In such use, the compounds are dispersed on an inert solid or in a liquid such as water and applied as a dust or spray. In a representative operation, O-chloroacetyl-5-nitro-2-furylamidoxime completely inhibited the growth of the above-named organisms when employed as an aqueous composition in a concentration of 50 parts per million.

The compounds of the present invention can be prepared by the reaction of equimolar amounts of 5-nitro-2-furylamidoxime and a compound of the formula RCOCl. Preferably, the reaction is carried out in the presence of an inert solvent such as ethanol or benzene, as well as an HCl acceptor such as pyridine or triethylamine and at the reflux temperature of the reaction mixture. Upon completion of the reaction, the reaction mixture is cooled or concentrated to precipitate the desired product which is thereafter recrystallized from a suitable solvent.

The examples which follow further illustrate the invention but are not to be construed as limitations thereof.

EXAMPLE 1

*5-Nitro-2-Furylamidinoethylcarbonate*

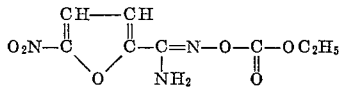

To a refluxing solution of 6.8 grams (0.04 mole) of 5-nitro-2-furylamidoxime and 6.3 grams (0.08 mole) of pyridine in 500 ml. of ethanol was added portionwise a solution of 4.4 grams (0.04 mole) of ethylchlorocarbonate in 50 ml. of benzene. After refluxing for 3 hours, the reaction mixture was evaporated to dryness and the residue recrystallized twice from ethanol to obtain the desired 5-nitro-2-furylamidinoethylcarbonate as a crystalline solid which melted at 151°–152° C. and was found to contain 17.26% nitrogen compared to the calculated nitrogen content of 17.28%.

By substituting methylchlorocarbonate, propylchlorocarbonate or butylchlorocarbonate for the ethylchlorocarbonate in the above reaction, there is obtained 5-nitro-2-furylamidinomethylcarbonate, 5-nitro-2-furylamidinopropylcarbonate and 5-nitro-2-furylamidinobutylcarbonate, respectively.

EXAMPLE 2

*O-Acetyl-5-Nitro-2-Furylamidoxime*

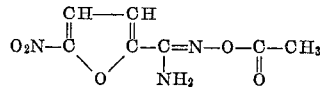

One-tenth mole (17.1 grams) of 5-nitro-2-furylamidoxime and 0.1 mole (7.8 grams) of acetyl chloride in 900 ml. of benzene was refluxed for 12 hours. Upon completion of the reaction, the reaction mixture was concentrated and the residue recrystallized from ethanol to obtain the desired product as a yellow solid melting at 165–166° C. Upon analysis, the product was found to contain 19.81% nitrogen whereas the calculated value was 19.72% nitrogen.

When the acetyl chloride of this example is replaced by propionyl chloride, butyryl chloride or valeryl chloride, there is readily obtained O-propionyl-5-nitro-2-furylamidoxime, O-butyryl-5-nitro-2-furylamidoxime and O-valeryl-5-nitro-2-furylamidoxime, respectively.

EXAMPLE 3

*O-Chloroacetyl-5-Nitro-2-Furylamidoxime*

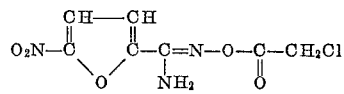

A mixture of 6.8 grams (0.04 mole) of 5-nitro-2-furylamidoxime and 4.6 grams (0.04 mole) of chloroacetyl chloride in 900 ml. of benzene was refluxed for 48 hours. Upon cooling the reaction mixture, the desired O-chloroacetyl-5-nitro-2-furylamidoxime precipitated and after recrystallization from ethyl acetate melted at 182°–183° C. with decomposition. The product contained 17.26% nitrogen compared to the theoretical value of 16.97% nitrogen.

When chloropropionyl chloride, chlorobutyryl chloride or chlorovaleryl chloride is substituted for the chloroacetyl chloride of the above example, the corresponding O-chloropropionyl, O-chlorobutyryl and O-chlorovaleryl derivatives of 5-nitro-2-furylamidoxime are readily obtained.

EXAMPLE 4

*O-Benzoyl-5-Nitro-2-Furylamidoxime*

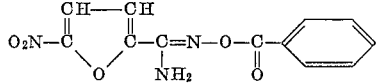

To a solution of 5.1 grams (0.03 mole) of 5-nitro-2-furylamidoxime in 500 ml. of benzene was added 3.9 grams (0.05 mole) of pyridine and 4.2 grams (0.03 mole) of benzoyl chloride. The reaction mixture was refluxed for 3 hours and thereafter cooled to precipitate the desired O-benzoyl-5-nitro-2-furylamidoxime which after recrystallization from ethanol melted at 209°–210° C. with decomposition and contained 15.17% nitrogen compared to the calculated value of 15.27% nitrogen.

5-nitro-2-furylamidoxime employed as a starting material in the present invention is a yellow solid which melts at 177°–178° C. with decomposition. It can be synthesized by refluxing equimolar amounts of 5-nitro-2-furylnitrile and hydroxylamine hydrochloride in an inert solvent in the presence of a base such as potassium hydroxide.

What is claimed is:
1. A compound of the formula

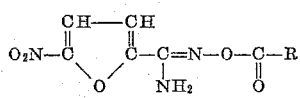

wherein R is a member of the group consisting of loweralkyl, loweralkoxy, chloroloweralkyl and phenyl.

2. 5-nitro-2-furylamidinoethylcarbonate.
3. O-acetyl-5-nitro-2-furylamidoxime.
4. O-chloroacetyl-5-nitro-2-furylamidoxime.
5. O-benzoyl-5-nitro-2-furylamidoxime.

References Cited in the file of this patent

Dunlop et al.: Furans, ACS Monograph No. 119 (1953), pages 540–1.